(12) United States Patent
Andersson et al.

(10) Patent No.: US 7,814,791 B2
(45) Date of Patent: Oct. 19, 2010

(54) SENSOR DEVICE

(75) Inventors: Gert Andersson, Lindome (SE); Henrik Rodjegard, Orersjo (SE)

(73) Assignee: Imego AB, Gothenburg (SE)

( * ) Notice: Subject to any disclaimer, the term of this patent is extended or adjusted under 35 U.S.C. 154(b) by 235 days.

(21) Appl. No.: 11/849,681

(22) Filed: Sep. 4, 2007

(65) Prior Publication Data

US 2009/0013783 A1 Jan. 15, 2009

Related U.S. Application Data

(63) Continuation of application No. PCT/SE2005/001570, filed on Oct. 20, 2005.

(51) Int. Cl.
G01P 3/44 (2006.01)
(52) U.S. Cl. .................... 73/504.03; 73/504.02; 73/510
(58) Field of Classification Search ................... 73/510, 73/504.03, 488, 493, 503.3, 504.02, 511, 73/514.02
See application file for complete search history.

(56) References Cited

U.S. PATENT DOCUMENTS

| | | | |
|---|---|---|---|
| 4,125,017 A | 11/1978 | Dhuyvetter et al. | |
| 4,179,818 A * | 12/1979 | Craig | 33/321 |
| 4,190,364 A * | 2/1980 | Ljung et al. | 356/468 |
| 4,280,188 A | 7/1981 | Weinstein et al. | |
| 4,841,773 A | 6/1989 | Stewart | |
| 4,914,598 A | 4/1990 | Krogmann et al. | |
| 4,920,801 A * | 5/1990 | Church | 73/514.16 |
| 5,203,208 A * | 4/1993 | Bernstein | 73/504.12 |
| 6,085,590 A | 7/2000 | Stewart et al. | |
| 6,782,742 B1 * | 8/2004 | Adebjork et al. | 73/170.01 |
| 6,955,082 B2 * | 10/2005 | Adebjork et al. | 73/181 |
| 2003/0163282 A1 | 8/2003 | Krieg et al. | |
| 2003/0209789 A1 | 11/2003 | Hanson et al. | |
| 2008/0236242 A1 * | 10/2008 | Stewart | 73/1.38 |
| 2009/0205422 A1 * | 8/2009 | Caron et al. | 73/504.12 |
| 2010/0071439 A1 * | 3/2010 | Caron | 73/1.38 |

FOREIGN PATENT DOCUMENTS

| | | |
|---|---|---|
| DE | 19610554 | 5/1995 |
| WO | 8911632 | 11/1989 |

OTHER PUBLICATIONS

A Supplementary European Search Report issued on Nov. 25, 2009 from the European Patent Office for corresponding European Application o. 05796298.7.

* cited by examiner

*Primary Examiner*—Hezron Williams
*Assistant Examiner*—Samir M Shah
(74) *Attorney, Agent, or Firm*—Cauthier & Connors LLP

(57) ABSTRACT

The present invention is related to sensor arrangements and particularly to sensor arrangements for symmetric response in a x-, y- and z-coordinate system. The arrangement comprises four gyroscopes with one axis arranged into different directions of sensitivity.

14 Claims, 4 Drawing Sheets

SENSOR DEVICE

PRIORITY INFORMATION

The present application is a continuation of PCT Application Serial No. PCT/SE2005/001570 filed on Oct. 20, 2005 that claims priority to Swedish Application Serial No. SE-0402566-4, filed on Oct. 20, 2004. Both applications are incorporated herein by reference in their entireties.

TECHNICAL FIELD

Background of the Invention

Traditionally, IMUs (Inertial Measurement Units) are constructed using three accelerometers and three gyros having their sensitivity direction in three orthogonal planes, for example in one perpendicular corner. However, no information is obtained with this configuration about the sensors' precision and it is difficult to detect the malfunction of one of the sensors malfunction. Moreover, the system is sensitive to disturbances as the sensors cannot be coupled differentially.

U.S. Pat. No. 4,179,818 describes a redundant inertial reference system with four gyroscope units having two axes, with the spin axes of the gyroscopes in the units being perpendicularly oriented to the four faces of an equilateral tetrahedron. This configuration gives an angle of approximately 109.4 degrees between the spin axes of the gyroscopes. Also, the system according to U.S. Pat. No. 4,179,818 requires eight gyroscopes with one axis or four gyros with two axes to be able to provide a symmetrical response in an x-, y- and z-coordinate system. The main difference between the U.S. Pat. No. 4,179,818 and the present invention is that gyros with two axes (or eight gyros with one axis) are being used in U.S. Pat. No. 4,179,818.

WO89/11632 deals with an inertial sensor with axes placed downwards. Six gyros and six accelerometers are arranged on the surfaces of a sensor base part. The sensors are arranged so that their in-axes pass through a common central point and their common central point is the center of gravity for the entire arrangement.

This invention aims to solve the problem with redundant IRUs and discloses a fixture for receiving a simple base unit for receiving IMS. The different embodiments of the invention disclose an arrangement of six gyroscopes and six accelerometers. This presents a more complicated arrangement and an increase in cost.

SUMMARY OF THE INVENTION

The present invention discloses a solution which uses four gyros with one axis and four accelerometers with one axis in order to create differential sensor signals in all directions.

This means, for example, that an accelerometer with three axes according to SE9203648, which is hereby incorporated by reference, with four masses and four gyroscopes with one axis is being used. In this fashion, all interference that influence all sensors in the same way, such as offset drifting of temperature, noise from feeding ripples or mechanical tensions coupled from a support substrate, are attenuated.

As a further advantage, an additional signal giving information about the state of the IMUs is obtained. Moreover, a redundant system is obtained, which is fully functional even in the case of one gyro or one accelerometer malfunctioning—albeit at a somewhat lesser performance.

Apart from these advantages, the present invention also introduces a simplified structure compared to U.S. Pat. No. 4,179,818 and an improvement of a traditional IMU structure.

For the reasons above, a sensor arrangement, preferably for a symmetrical response in a x-, y- and z-coordinate system, is provided. The arrangement comprises four gyroscopes with one axis arranged with different sensitivity directions. Also, the arrangement comprises an accelerometer.

A symmetrical measurement accuracy is obtained in all directions due to the fact that an angle of inclination ($\alpha$) between an xy-plane and the sensitivity axes of the accelerometer is located in an interval around the angle of inclination ($\alpha$). The sensors can be produced and enclosed and/or mounted with the correct sensitivity direction with the corresponding angle of inclination ($\alpha$). The sensors are manufactured with the correct sensitivity direction on the same chip comprising two or four sensor elements.

In one embodiment, the sensor may be mounted onto specially manufactured sockets inclined at said angle of inclination ($\alpha$) respectively. In another embodiment, the sensor may be mounted onto a structure with inclined carrier surfaces. The sensor may also be mounted onto a flexible substrate attached to wedges. Preferably, the sensors are mounted onto a mechanical fixture.

The angle ($\alpha$) is preferably located in the interval 25°-50°, more preferably at approximately 35°, i.e., $\arctan(1/\sqrt{2})=35.3°$. The angle ($\alpha$) can also be located in the interval 40°-65°, preferably at 55°, i.e. $90°-\arctan(1/\sqrt{2})$ if the axis of sensitivity for the sensor is vertical.

In one other embodiment of the present invention, four support structures are leaningly mounted and essentially arranged side by side, thereby building the faces of an essentially pyramid-like structure, where each carrier structure comprises a gyroscope with one axis. Four accelerometers are designed as an accelerometer with three axes with four masses arranged on a support structure building a top- or a bottom plane for said leaning structures. Four support structures are leaningly mountable and essentially arranged side by side constituting the faces of an essentially pyramid shaped structure, where each support structure comprises an accelerometer with one axis. The sensitivity axes for the gyros and the optional accelerometer are parallel to the plane of the support structure and directed up- or downwards with respect to the plane in order to obtain an optimum configuration with an approximate angle ($\alpha$) with respect to the base. Preferably the sensors are mounted in right angles by using plane substrates together with wedges.

The support structure may be a substrate provided with a recess with leaning walls, where one end of the gyroscope is arranged against one of the leaning walls, where the angle between the sensitivity axis of the gyroscope and the gyroscope itself corresponds to the angle of inclination ($\alpha$).

The present invention further provides a method for achieving a symmetrical response in an x-, y- and z-coordinate system by means of a sensor arrangement comprising at least five sensors. The method comprises the steps for arranging four gyroscopes with one axis and an accelerometer with each of their sensitivity axes in each direction.

BRIEF DESCRIPTION OF THE DRAWINGS

The present invention will now be described in a non-limiting way with reference to the enclosed drawings in which.

DETAILED DESCRIPTION OF PREFERRED EMBODIMENTS

Figure 1:
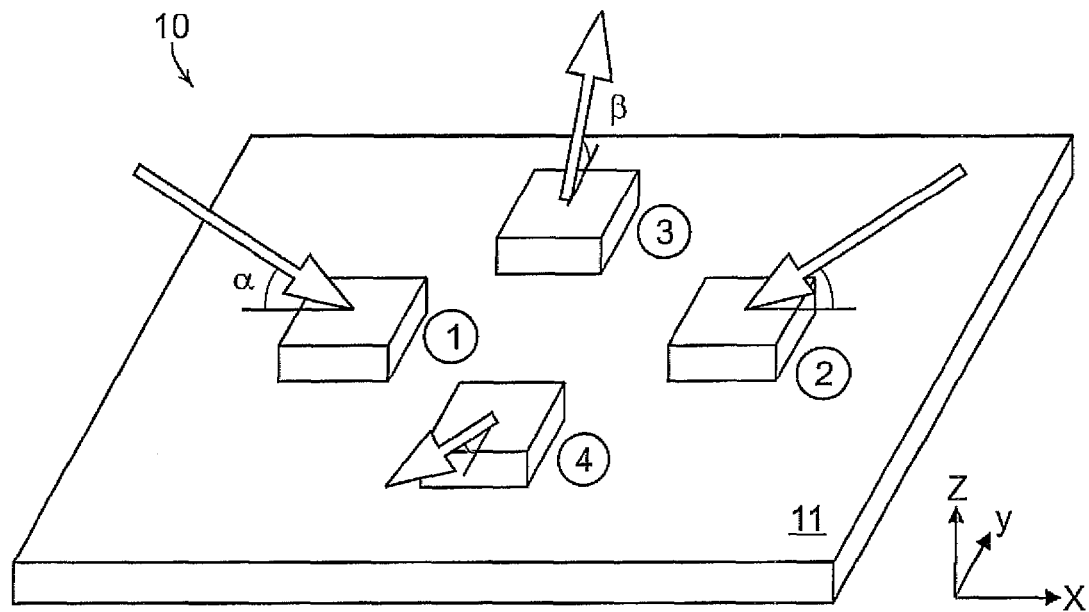
FIG. 1 illustrates a first embodiment of the arrangement of accelerometers or gyroscopes FIG. 2 schematically shows a second embodiment of the arrangement of accelerometers or gyroscopes FIG. 3-5 schematically shows a perspective view of a preferred embodiment of a sensor arrangement according to the present invention.

The principle for the mounting of the sensors is shown in FIG. 1 schematically showing a first embodiment of a sensor arrangement 10 with four sensors 1-4 mounted onto a substrate in the form of accelerometers or gyroscopes. In this fashion, the sensors are arranged in the form of faces of a rectangle. The sensitivity axes for the respective sensors are illustrated by arrows, where the sensitivity axes for sensors 1 and 2 are directed towards the sensors at an angle α, whereas the sensitivity axes for sensors 3 and 4 are directed outwards from the sensors at an angle β.

With the four sensors configured according to FIG. 1 the x-, y- and z-signals are obtained as:

$$x_{signal} \propto 1_{signal} - 2_{signal}$$

$$y_{signal} \propto 3_{signal} - 4_{signal}$$

$$z_{signal} \propto 1_{signal} + 2_{signal} + 3_{signal} - 4_{signal}$$

$$0 = -1_{signal} + 2_{signal} + 3_{signal} - 4_{signal}$$

In the equations above, the numbers 1-4 correspond to the accelerometers or gyros 1-4.

The last equation comprises the information on the state of the measurement system, such as, for example, the present noise level. This level will be non-zero in the event that "common-mode" noise influences the system or if one sensor starts to act peculiarly.

Figure 2:
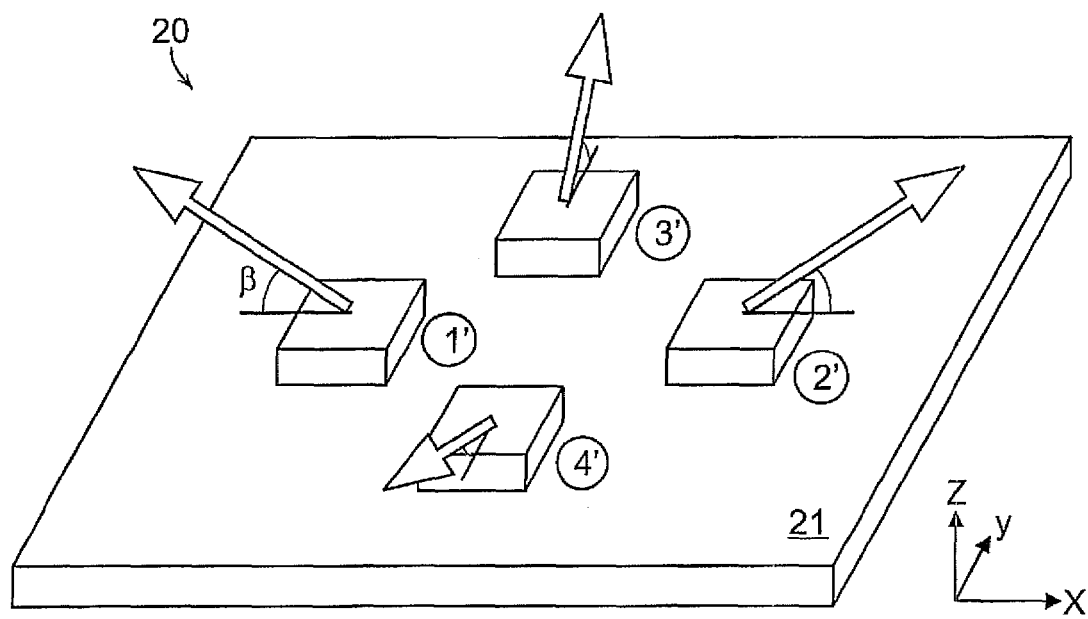

Another, event though not as fully optimal, way of mounting the sensors, but which nevertheless is simpler from the manufacturing point of view, is to let all sensors be oriented in the same direction as shown in FIG. 2. The sensor arrangement 20 consists of four sensors 1'-4' mounted onto the substrate 21 in the form of accelerometers or gyroscopes.

Also here, the sensors are arranged in the form of faces of a rectangle. The sensitivity axes for the sensors are illustrated by arrows, where the sensitivity axes for all sensors are directed outwards from the sensors in an angle β'. Also in this case, the axes of sensitivity are illustrated by means of arrows.

With four sensors configured as shown in FIG. 2 the x-, y- and z-signals are obtained according to:

$$x'_{signal} \propto 2'_{signal} - 1'_{signal}$$

$$y'_{signal} \propto 3'_{signal} - 4'_{signal}$$

$$z'_{signal} \propto 3'_{signal} + 1'_{signal} + 4'_{signal} + 2'_{signal}$$

$$0 = -1'_{signal} - 2'_{signal} + 3'_{signal} + 4'_{signal}$$

In order to obtain accurate measurements in all directions the angle of inclination α between the xy-plane and the respective sensitivity axis for the sensors should be chosen from the interval 25°-50°, more preferably at approximately 35°, i.e. arctan(1/√2)=35.3°. This can be achieved in various ways, such as:

1) Manufacturing and encapsulating the sensors directly or mounting them in the right sensitivity direction, 2) Manufacturing the sensors onto the same chip in the right sensitivity direction. Such a chip may comprise two or four sensor elements.

3) Mounting the sensors into specially manufactured sockets inclined at an angle α (or β, i.e. 40°-65°, preferably at approximately 55° (=90°-arctan(1/√2) if the sensitivity axis for the sensor is located vertically)). Mounting can be performed on both sides of the substrate in order to obtain different directions for the sensitivities in the z-direction.

4) Mounting the sensors onto a structure with leaning carrier surfaces, such as in the shape of a pyramid, or onto a flexible substrate attached to wedges or to an essentially pyramid-shaped structure, or 5) by mounting onto a mechanical fixture.

During the mounting one may place emphasis on that thermal expansion of the carrier should affect all sensor elements in the same way in order to obtain the usefulness of differential signals.

Figure 3:
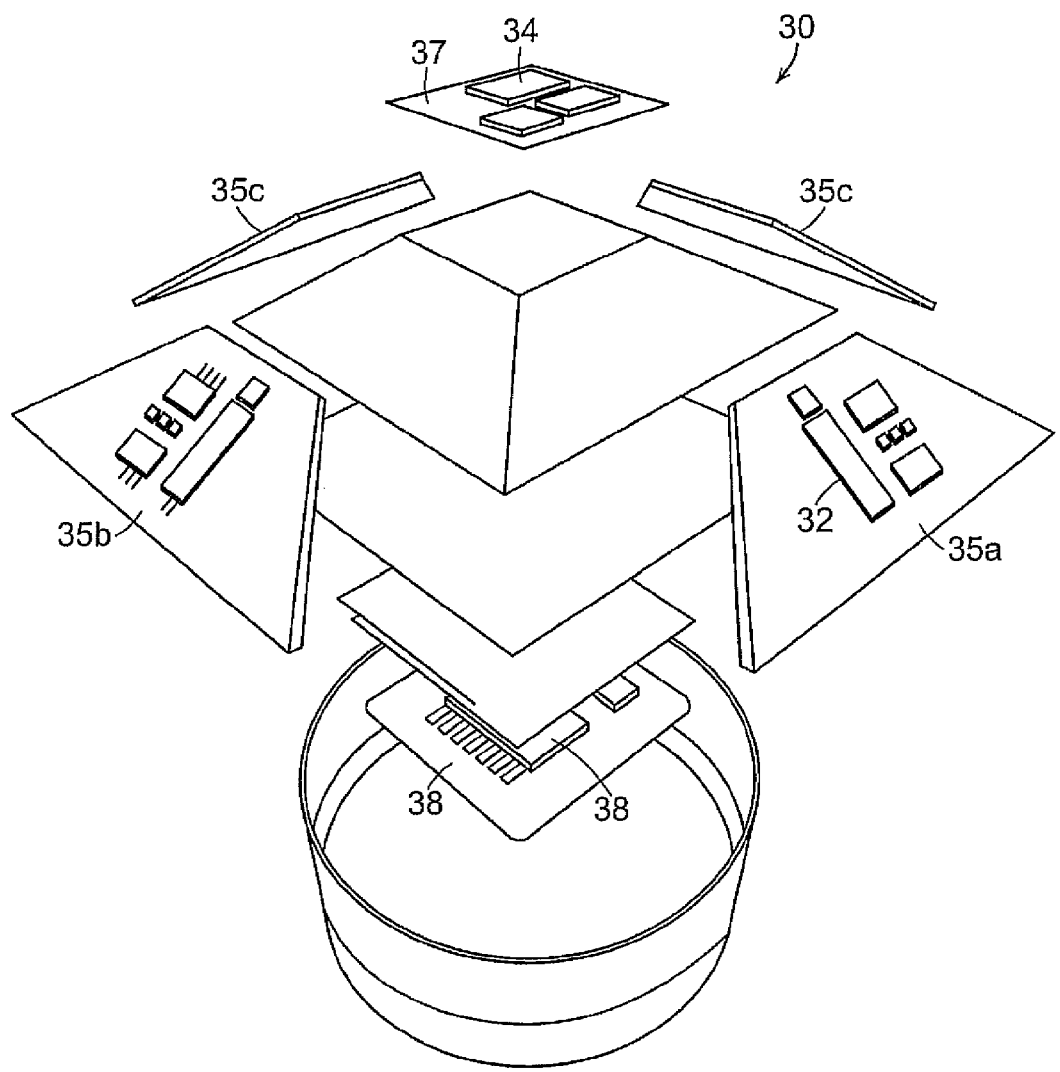
Figure 4:
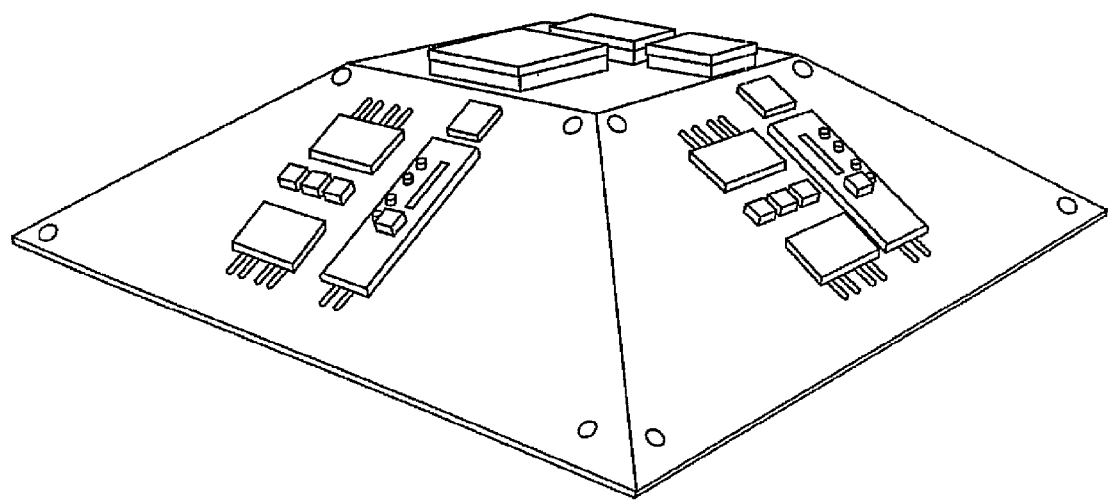
Figure 5:
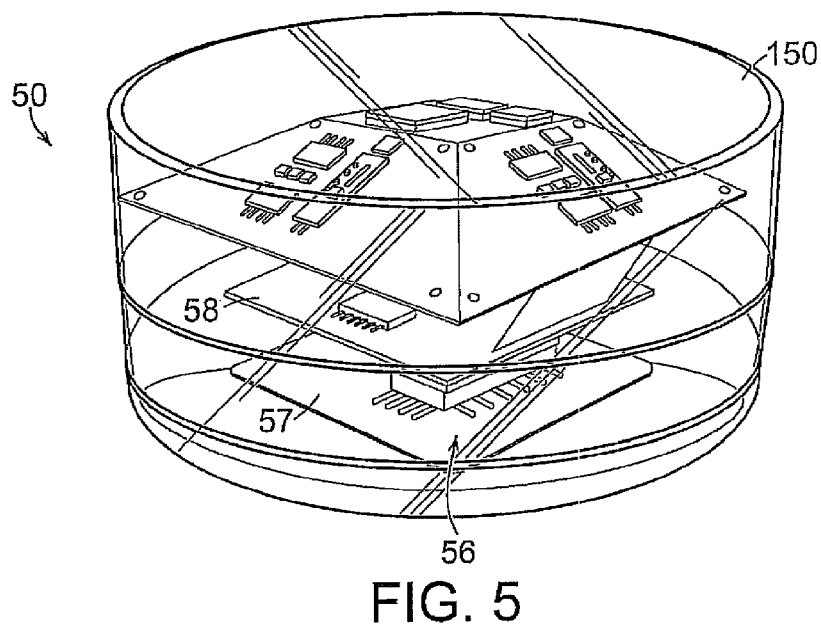

FIGS. 3-5 show an example embodiment based on a structure with carrier structures inclined at an angle, i.e. essentially pyramid-shaped substrates (printed circuit boards) where an accelerometer with three axes according to the Swedish patent SE9203648-2 (WO94/12886), which is hereby incorporated by reference, is mounted onto the top of a truncated and essentially pyramid-shaped structure and where four gyros with one axis are mounted onto the sides of a pyramid-shaped structure (gyros for example according to the Swedish patent SE9800194-4 (U.S. Pat. No. 6,467,349) are hereby incorporated by reference):

FIG. 3 shows an exploded view of a modular system of the sensor arrangement 30 in which sensor cards 35a-35c are mounted on the faces of the pyramid, where the sensor cards 35a-35c comprise gyros 32 with one axis together with the most sensor-near electronics 36, such as analog parts produced as ASICs.

The sensor cards may additionally comprise accelerometers with one axis if the aforementioned accelerometers 34 with three axes are not mounted onto the top card 38 (or onto a base plate). The sensitivity axes for both gyros and possibly accelerometers with one axis are preferably parallel to the plane of the cards and direct upwards or downwards in order to obtain optimum configuration and form an angle of approximately 35° with the base. The system may consist of loose faces as illustrated in the sketch, but also be arranged as a ceramic and essentially pyramid-shaped structure in one piece.

The rest of the sensor-near electronics 39 (digital parts) is placed onto a card 38 on the base of the pyramid, such as a FPGA (Field Programmable Gate Array), where the card 38 controls the output of the modulated and temperature compensated signals or raw resonance data from the sensor modules depending on whether subsequent signal processing is carried out or not.

The embodiment provides for plugging in of different modules according to need, such as powerful DSP-modules (Digital Signal Processing) depending on how advanced signal processing concepts are to be implemented. Communication and power supply modules among others may also be plugged in.

FIG. 4 illustrates the assembled printed circuit boards according to the example embodiment shown in FIG. 3. The pyramid-shaped sensor module comprises an accelerometer with three axes (with four independent masses) on top with electronics and a gyro with accompanying electronics on each side.

FIG. 5 shows an assembled system 50 according to FIG. 3 in a (transparent) cover 150. In the figure a DSP-part 58 is also visible as well as cables for communication with the communication unit 56. The communication with the outside world may be performed via a port (not shown) or by means of a wireless connection.

Figure 6:
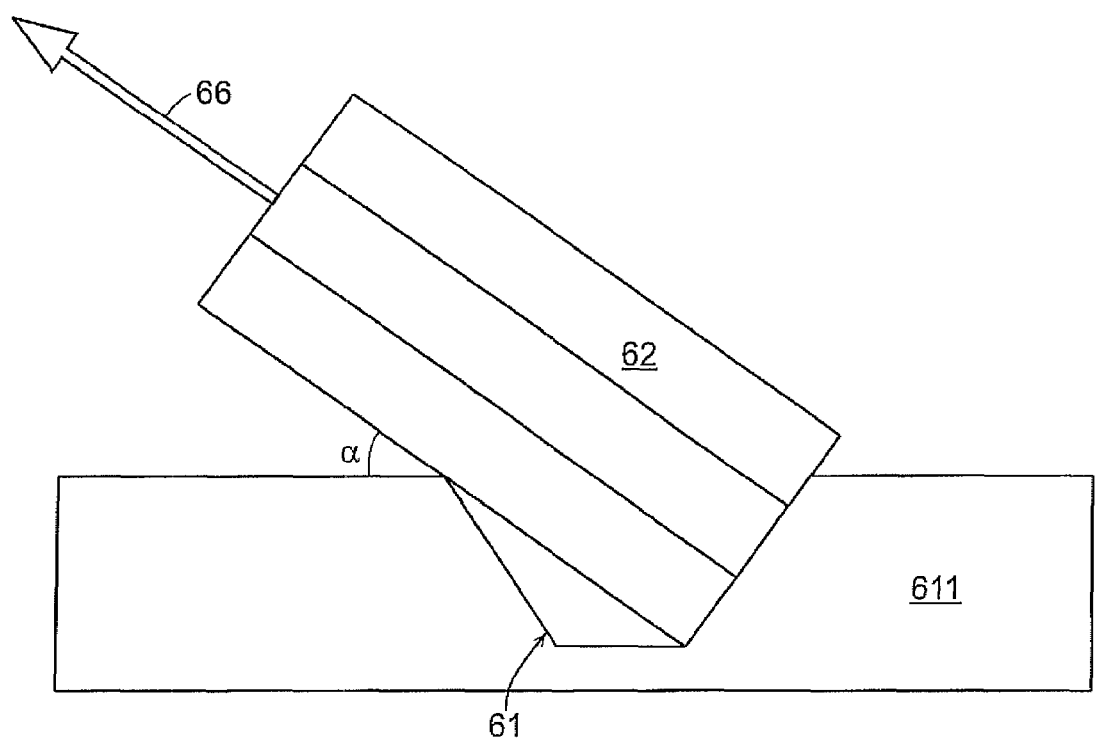
FIG. 6 schematically shows an embodiment of a sensor mounting according to the present invention.

Additionally, the sensors may be mounted at the "right" angle by means of a substrate located on wedges or for example by using anistropical etching of silicon, which also would yield the "right" angle. The latter embodiment is shown in FIG. 6. The substrate 61 is provided with a recess 611 with leaning walls. One end of the gyroscope 62 is arranged leaning against one of the leaning walls. The angle between the sensitivity axis 66 for the gyroscope and the gyroscope in this case is α.

In one embodiment the invention is realized as an IMU.

The invention is not limited to the aforementioned embodiments, but may be varied in different ways without departing form the scope of the attached claims and the arrangement and method may be implemented in various ways depending on application, functional units, need, requirements and so on.

What is claimed is:

1. A redundant sensor arrangement for a symmetrical accuracy in an orthogonal x-, y- and z-coordinate system,
   wherein said arrangement comprises at most four single axis sensors, each sensor is one of a gyroscope or an accelerometer, each sensor has one sensitivity axis and each sensitivity axis is directed in one direction, such that a symmetrical accuracy is obtained in all directions by choosing an angle of inclination (α) between an xy-plane and each of said sensors, wherein the angle of inclination (α) for said sensors is chosen for an interval of 25°-50° and a sum of signals from each sensor is approximately zero (0).

2. The arrangement according to claim 1, wherein the sensor arrangement is manufactured and encapsulated or mounted with the sensitivity direction in the direction of the angle of inclination (α).

3. The arrangement according to claim 1,
   wherein the sensor arrangement is manufactured with the right sensitivity direction on the same chip, where the chip comprises two or four sensor elements.

4. The arrangement according to claim 1, wherein the sensor arrangement is mounted onto sockets being inclined at said angle of inclination (α).

5. The arrangement according to claim 1, wherein the sensor arrangement is mounted on a structure with leaning carrier surfaces.

6. The arrangement according to claim 1, wherein the sensor arrangement is mounted onto a flexible substrate which is fastened onto wedges.

7. The arrangement according to claim 1, wherein the sensor arrangement is mounted onto a mechanical fixture.

8. The arrangement according to claim 1,
   wherein said angle (α) is located in the interval 40°-65°.

9. The arrangement according to claim 1, wherein four carrier structures are leaningly mounted and arranged essentially side by side forming the sides of an essentially pyramid-shaped structure, where each carrier structure comprises one gyroscope with one axis.

10. The arrangement according to claim 9, wherein four gyroscopes are arranged as accelerometers with three axes and with four masses arranged on a carrier structure building the top or the bottom plane of said leaning structures.

11. The arrangement according to claim 1,
    wherein four carrier structures are leaningly mounted and arranged essentially side by side, forming sides of an essentially pyramid-shaped structure, where each carrier structure comprises a single axis accelerometer.

12. The arrangement according to claim 11, wherein the sensitivity axis for said sensors with one axis is parallel to the planes of the carrier structures and directed upwards or downwards in relation to the planes for obtaining optimum configuration with an approximate angle of inclination (α) with the base.

13. The arrangement according to claim 1, wherein the sensors are mounted in right angles by means of plane substrates located on wedges.

14. The arrangement according to claim 1, wherein the carrier structure is a substrate provided with a recess with leaning walls, wherein one end of a gyroscope is arranged to be leaning against one of the leaning walls, where the angle between the sensitivity axis for the sensor and the sensor corresponds to the angle of inclination (α).

* * * * *